Patented May 30, 1950

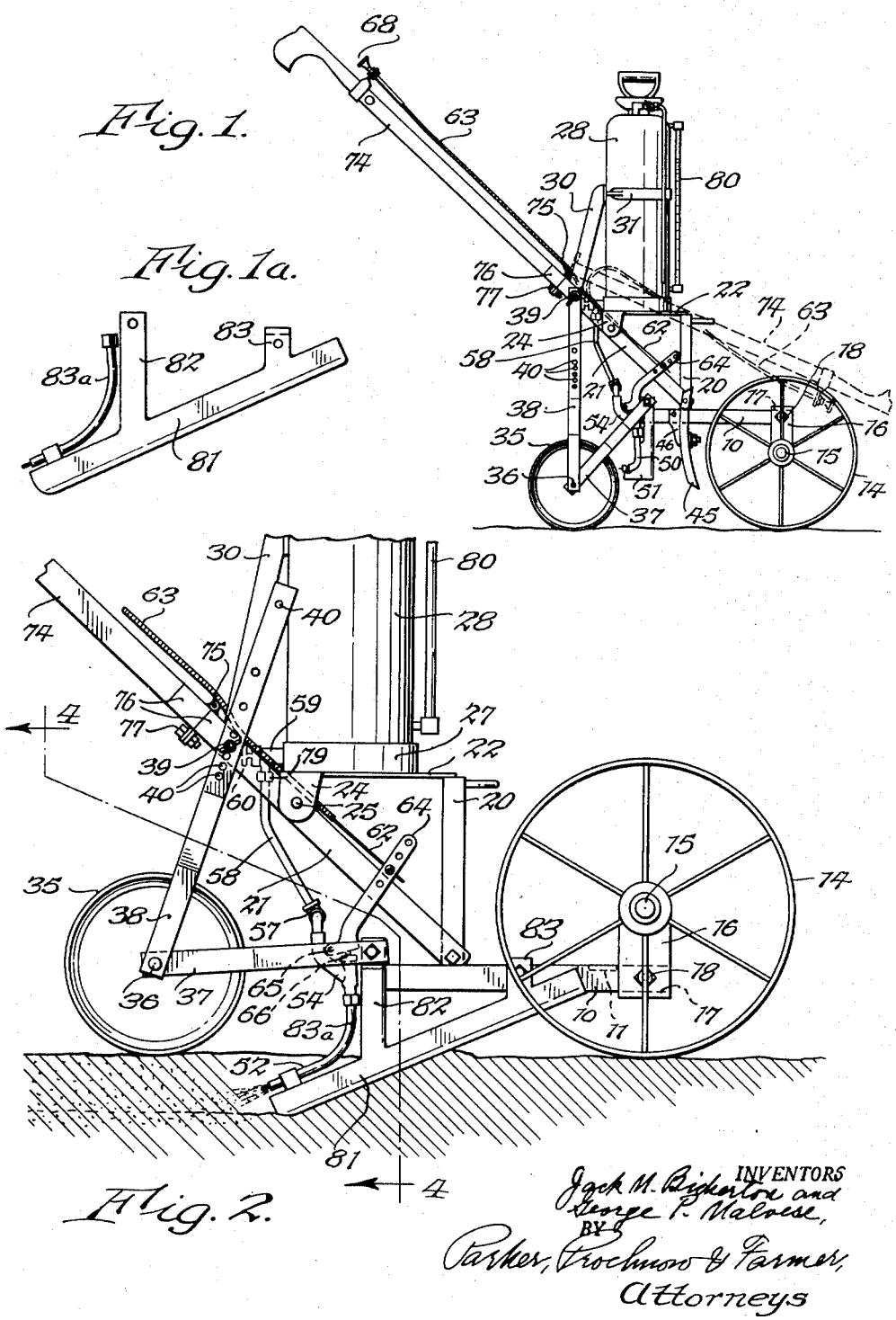

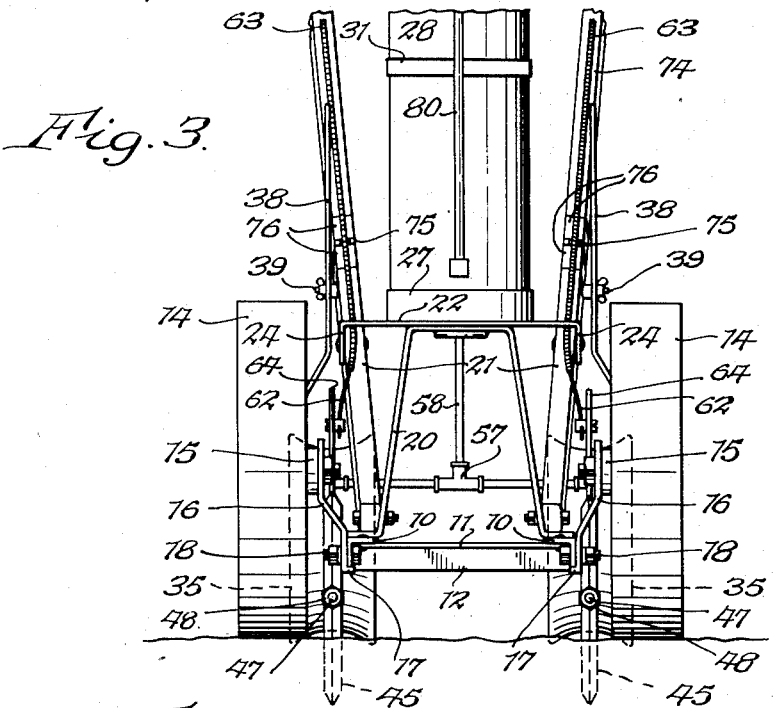
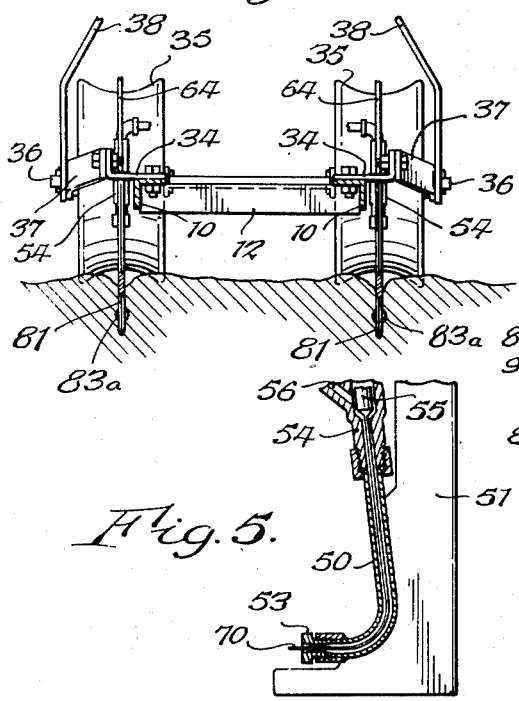
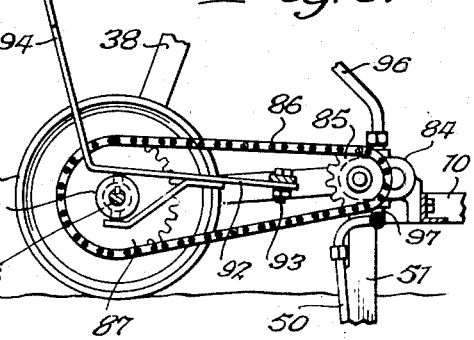

2,509,627

UNITED STATES PATENT OFFICE 2,509,627

APPARATUS FOR INJECTING LIQUIDS UNDER THE SOIL

Jack Mayson Bickerton, East Hempstead, and George Peter Malvese, Mineola, N. Y., assignors to Innis, Speiden & Co., Niagara Falls, N. Y.

Application February 23, 1945, Serial No. 579,424

6 Claims. (Cl. 111—7)

This invention relates to improvements in apparatus for injecting liquid under the soil, and more particularly this invention relates to the use of volatile liquids, such, for example, as are used as soil fumigants for partial soil sterilization to control various soil-borne plant pathogens and other undesired organisms including fungi, insects, bacteria, nematodes, weed seeds and pernicious weeds.

One of the objects of this invention is to provide an apparatus by means of which liquid may be injected rapidly and efficiently into the soil to the desired depth, and which covers the liquid injected into the soil so as to prevent excessive escape of vapors of the liquid. Another object of this invention is to provide an apparatus of this type which can be easily manipulated and operated, which is of sturdy and durable construction, and which operates by moving the same over the surface of the soil. A further object is to provide an apparatus of this type having a cutting member which forms a narrow cut or trench of the desired depth in the soil in such a way that organic debris, such as roots, stems and manure, is cut and sloughed off, and which part is followed by a tube which conducts the liquid into the portion of the soil through which said cutting member has passed a considerable distance below the surface of the soil. A further object is to provide an apparatus of this kind with means for supporting a discharge tube so that it may pass through the soil without bending or otherwise becoming damaged by its passage through the soil. A further object of this invention is to provide a tube of this kind with means for preventing clogging of the tube due to the entry of soil and other materials into the discharge end of the tube. A further object is to provide an apparatus which is so constructed that parts thereof may be placed into inoperative positions in which apparatus occupies comparatively little space for packaging the same. Other objects and advantages of this invention will appear from the following description and claims.

In the accompanying drawings which illustrate by way of example one embodiment of this invention:

Fig. 1 is a side elevation of a soil treating apparatus embodying this invention, showing the parts in position in transport positions.

Fig. 1a is a side elevation of another form of soil cutter and liquid injector which may be used on our soil treating apparatus.

Fig. 2 is a fragmentary side elevation thereof, on a larger scale, showing the parts in positions for operating on the soil and showing the cutter and injector shown in Fig. 1a mounted on the apparatus.

Fig. 3 is a fragmentary front elevation of the apparatus shown in Fig. 1.

Fig. 4 is a sectional elevation on line 4—4, Fig. 2, of the apparatus shown in Fig. 2.

Fig. 5 is an enlarged view of the lower portion of the liquid discharge tube and its supporting member.

Fig. 6 is a fragmentary sectional elevation of a modified form of our apparatus.

The apparatus is constructed so that it can be rolled over the surface of the ground, either manually or by power, a manually-operated apparatus being shown in the construction illustrated, and has a cutting attachment mounted thereon which forms a relatively deep and narrow trench or slit in the ground into which the liquid is discharged. Any suitable support or carriage may be provided for carrying the apparatus, and in the construction illustrated by way of example, the apparatus is constructed to discharge two streams of liquid into two trenches spaced apart the desired distance, but it will be understood that this invention may be applied to an apparatus discharging a single stream of liquid into the ground or to apparatus discharging more than two streams into the ground.

The particular apparatus illustrated includes a pair of longitudinal frame members 10 which are preferably formed of angle bars and which are connected adjacent to the front ends thereof by a bar 11 and adjacent to their rear ends by means of another cross bar 12. Each longitudinal frame member 10 is supported at its front end by means of a wheel 14 and the apparatus is so constructed that the frame member may be supported on the front wheel in elevated position, as shown in Fig. 1, for transport of the apparatus, or in a lower or operative position, as shown in Fig. 2, when in use. For this purpose, each front wheel is journalled on a suitable axle 15 rigidly secured to a crank member 16 which is, in the construction shown, made of a flat piece of metal having one end rigidly secured to the axle and having the outer edge of the other end thereof bent over approximately 90 degrees to form a seat 17 for an edge of the adjacent longitudinal frame member 10. This crank part 16 may be secured to the front end of its longitudinal frame member 10 by means of a bolt or pivoting member 18. When the frame is in transport position, as shown in Fig. 1, each longitudinal frame member 10 is bolted to the crank part 16 while the same extends upwardly from the axle and the projecting part 17 will lie over the upper edge of the frame member 17 so that when the two parts are bolted together, the crank part 16 will be held against turning relatively to the longitudinal frame member 10. When the frame is to be placed in lowered or operative position, each of the crank parts 16 is bolted to a frame member 10 in the position shown in Figs. 2 and 3 so that the flanges or bent-over parts 17 extend along the lower edges of the frame members 10. Any other means for mounting the frame member on the front wheels 14 may be provided.

The frame member includes an upwardly extended inverted U-shaped part 20, the lower ends of which are suitably secured to the longitudinal frame members 10, and a pair of handles 21 are suitably secured to the frame. By means of these handles, the apparatus can be pushed along the ground or directed in case it is propelled by power means, the lower ends of the handles 21 in the construction shown being bolted to the lower portions of the legs of U-shaped member 20. A platform 22 is supported at its front end thereof on a U-shaped frame member 20 and the rear end of the platform is provided with downwardly extending lugs 24 suitably secured by means of bolts 25 to the handles 21. The platform 22 preferably has a substantially circular upwardly extending ring 27 secured thereto which is formed to receive the lower end of a tank or container 28 for the liquid to be injected into the soil. In order to steady the tank 28, the handles may be provided with an upwardly extending inverted U-shaped member 30 to which a clamp band 31 extending around the tank 28 may be secured.

The rear end of the apparatus is preferably supported on a pair of rear wheels 35 which also serve to close the trench or slit in the ground into which the liquid is discharged, as will be hereinafter explained. The two rear wheels 35 are mounted on the ends of a single shaft 36 and this shaft is connected to the main longitudinal frame members 10 by means of bars 37, the front ends of which are bolted to brackets 34, Fig. 4, bolted or otherwise secured to the frame members 10. The rear ends of the bars 37 are pivoted to the shaft or axle 36, and upwardly extending bars 38 control the positions of the rear wheel shaft or axle. These bars 38 are also pivoted on the axle 36 and may be bolted to the handles 21 by means of suitable bolts 39. In order to adjust the positions of the rear wheels in relation to the frame so as to control the depth of injection of the liquid into the ground, the two bars 38 are provided at intervals with holes 40 through which the bolts 39 may be passed, the upper holes of the two bars being used when the parts of the apparatus are in transport position as shown in Fig. 1.

In order to inject liquid into the soil at sufficient depth to serve the desired purpose, we provide a cutting member on the frame of the apparatus which is so arranged that it extends into the soil to cut or form in the ground a narrow trench or slit of the desired depth into which a tube carrying the liquid may extend. Any suitable means may be provided for cutting a slit or trench of this type and, in the particular construction shown in Figs. 1 and 3, cutting members or cultivator steels 45 shown for this purpose are mounted on brackets 46 suitably secured to longitudinal frame members 10, the brackets shown depending from the frame members so that the cutting members 45 may be secured thereto by means of studs 47 secured on the brackets 46 and having their ends threaded to receive nuts 48 which clamp the cutting members in place. The cutting members shown by way of example are double-ended so that they may be inverted, so that either end may penetrate into the ground. While we have shown cutting members rigidly mounted on frame members, it will be obvious that disks may be used in place of the fixed cutting members 45 for forming the trench or cut in the soil. Preferably, these cutting members 45 are also so mounted on the frame of the apparatus that the lower portions of the cutting members incline forwardly, so that roots, stems, and the like which become entangled on the cutting member will be drawn upwardly out of the soil because of the inclination of the cutting member, and this action also tends to draw the apparatus downwardly toward the ground.

The liquid to be injected into the soil is discharged through a tube 50, which extends well into the trenches or slits formed by the cutting members 45, and in order to prevent these tubes from being bent or damaged by stones or other material in the soil, we preferably provide a downwardly extending reinforcing bar or plate 51 for each tube, the front end of which is preferably relatively sharp and to the rear edge of which the discharge tube 50 is firmly secured, for example, by welding, or the like. The upper end of each bar 51 may be welded or otherwise suitably secured to the bracket members 34 on the longitudinal frame members 10. The reinforcing bars 51 also serve to clear the trenches or slits 52 formed in the soil by the cutters 45, and in case of very loose soil, the reinforcing bars 51 in conjunction with the tubes again separate the soil to form trenches into which the liquid is discharged, and in the case of such soil, the cutting members 45 serve mainly to cut or pull up roots and other organic debris which might otherwise become clogged on the reinforcing bars 51.

The lower end of the tube 50 may, if desired, be provided with any suitable or desired discharge opening, that shown being provided with a removable nozzle or tip 53, see particularly Fig. 5.

Each soil penetrating or discharge tube 50 may be suitably coupled to a valve housing 54 containing a valve 55 and having a branch or side passage 56 therein. This valve when in its lowered or closed position may interrupt the flow of liquid from a branch passage 56 to the discharge tube 50. The branch passages 56, see Fig. 5, may be connected by any suitable tubes or pipes to a T-coupling 57 which is connected by means of a tube 58 to a discharge duct 59 of the tank 28, the discharge duct 59 being preferably controlled by means of a valve 60. Any other piping connection for conducting liquid from the tank 28 to the discharge tubes 50 may be provided.

It is also desirable to provide means for controlling the feed of liquid to each discharge tube 50 at all times during the travel of the apparatus over the soil, by means of the valves 55. This is preferably done by locating such control means adjacent to the upper parts of the handles of the apparatus. In the construction shown for this purpose, wires 62 enclosed in flexible tubes 63 are provided, one for each handle, the wires 62 of which connect with arms or levers 64 suitably pivoted at 65 on the valve bodies 54. The arms 64 have parts which engage valve stems 66 on the valves 55. Suitable operating knobs 68 are provided on the ends of the wires adjacent to the other ends of the handles, so that the valves 55 may be opened or closed as desired, independently of each other while the operator has his hands on the handles.

After the liquid has been discharged below the soil the narrow slits or trenches made by the cutter members 45 and by the discharge tubes 50, in most types of soil, will be immediately closed by soil falling back into the same. In order to make sure that the trenches are filled in over the liquid, and also to pack the soil over the liquid to prevent as much as possible the escape of vapors from the soil, we preferably arrange the rear wheels 35 on the frame of the apparatus so that they will ride over the trenches. The rims of the rear wheels are preferably concave, so that the edges of each wheel will be on opposite sides of the trenches and thus securely compact the soil in the trenches.

It is, of course, important that the discharge tubes 50 which extend underneath the soil are kept from becoming clogged or filled up with the soil, and in the particular construction illustrated, we have provided a novel arrangement for keeping these tubes clear to provide a uniform rate of discharge of liquid through the same, this being done as shown in the drawings, see particularly Fig. 5, by means of a flexible wire 70 which extends through the interior of the discharge tube and beyond the nozzle end thereof. The upper end of the wire may be secured in any suitable manner, and in the construction illustrated, we have secured the upper end of this wire to the valve 55. By means of this construction, when the valve is moved into open and closed positions, the wire 70 will be moved back and forth lengthwise of the tube which tends to clear the tube and particularly the nozzle of any obstructions which may become lodged therein. Furthermore, the outer end of the wire will come in contact with various particles of soil, small stones and other materials which will move the end of the wire continuously back and forth in various directions, which in turn will prevent any soil or other materials from settling within or about the nozzle end of the tube 50. The wire will to some extent keep soil particles from entering the tube 50 and will dislodge any particles which may enter into the tube. By means of this arrangement, an uninterrupted flow of liquid beneath the soil is assured.

It is also desirable to construct the apparatus so that the same may be folded into compact space. For this purpose, the handles 21 in the construction shown are made in two parts, which are securely connected when in their operative positions. This may be accomplished in any suitable or desired manner, for example, by providing a hinge connection 75 between the two parts of the handles, thus permitting the upper portions 74 of the handles to be folded over the frame of the apparatus, for example, as shown in Fig. 1. The upper handle parts 74 may be made of wood and may have their lower ends secured in metal sockets or sleeves 76, and these sockets and the upper ends of the lower parts of the handles 21 may be provided with outwardly extending lugs or projections which may be connected by means of bolts 77 so that the two parts of the handles will be rigidly held in their operative positions during the use of the apparatus.

The tank 28 is also detachably connected with the pipe 58, for example, by means of a coupling 79, so that the tank can readily be removed, thus materially decreasing the height of the apparatus when not in use, or when being shipped. This coupling is also necessary when it is desired to change tanks on the apparatus. The tanks are preferably closed to prevent the escape of gas therefrom, and each tank may be provided with a sight glass 80 to determine the quantity of liquid in the tank.

In place of the cutting members 45 and the reinforcing bars 51, runners, such as shown in Figs. 1a, 2 and 4, may be employed. Each of these runners includes a cutting blade 81 which is arranged at an angle to the soil with its leading end well above the soil. The runner may be attached to the carriage of the apparatus in any suitable manner, for example, by means of a pair of arms 82 and 83 extending upwardly from the blade 81. The arm 82 may be welded or otherwise secured to the frame in the same manner as the reinforcing bar 51 and the front arm 83 may be bolted to a longitudinal frame member 10. A tube 83a is connected with the valve housing 54 in the same manner as the tube 50 and is secured at its lower end to the rear end of the runner 81 in any suitable manner, for example, by means of a clamp as shown, or by welding. The arms 82 of the runners may be welded or otherwise secured to the tubes 83a so that the arms also act as reinforcing members for the tubes carrying the liquid into the soil.

This construction has the advantage that the blade 81 of the runner enters the ground by a slicing action and any roots, stems, etc., are either cut by the blade or forced downwardly below the lower end of the blade and has been found particularly desirable if the apparatus is propelled manually, since the downward push on the handles 74 tends to force the runner into the ground. Any other type of tool for cutting a slit or trench in the soil and for supporting the lower end of the liquid discharge pipe or tube may be employed, if desired.

The apparatus described as shown is intended to be operated by a person pushing on the handles, but it will be obvious that if desired, the apparatus may be driven by means of an engine or motor mounted thereon, in which case, either of the front wheels of the apparatus may be the tractor wheels as is customary in soil tilling and cultivating devices of this general type. It will also be obvious that the apparatus may be drawn by a tractor or a horse, this being particularly desirable in the event that the apparatus is built in large sizes with a relatively large number of discharge pipes.

In the construction shown in Figs. 1 to 5, the liquid is discharged from the tank 28 by gravity, but it will be obvious that a positive feed of the liquid may be provided, if desired. This positive feed may be of any suitable or desired type and is preferably such that the feed will be proportional to the distance travelled by the apparatus. By way of example, we have illustrated in Fig. 6, one form of apparatus by means of which this purpose can be accomplished, and in which a gear pump 84 is provided for delivering liquid from the tank to the discharge pipe. This pump has a sprocket wheel 85 mounted on the driving shaft thereof, which cooperates with the sprocket chain 86 passing over another sprocket wheel 87 which is rotatably mounted on the rear axle or shaft 88 on which the rear ground wheels 89 are secured so that the axle 88 revolves with the ground wheels 89. A clutch member 90 is splined to the axle and may be moved lengthwise of the axle into and out of engagement with a clutch member or clutch face secured to the sprocket wheel 87, for turning the sprocket wheel. The clutch member 90 may be shifted into and out of engagement with the sprocket wheel 87 by means of a rod 92 pivoted at 93 on the frame of the apparatus, and this rod may be bent so that the end 94 thereof forms a handle by means of which the clutch may be shifted.

The gear pump 84 receives liquid from the tank through a pipe 96 and discharges it to a pipe 97 connected to a T-coupling from which liquid is supplied to the discharge pipes 50. Any other suitable or desired means may be employed for discharging to the discharge tubes 50 quantities of liquid proportional to the distance travelled by the apparatus over the ground, and if desired, a separate pump may be provided for each discharge pipe 50.

The apparatus described is very effective for use in injecting chlorpicrin or other volatile liquids, and particularly volatile liquids, into the soil to a sufficient depth so that the apparatus may be used for ridding infested soil of various organisms which are harmful to plant growth or are otherwise undesired. Such organisms, including fungi, bacteria, nematodes, insects, weed seeds, and pernicious weeds, are a factor at various depths below the soil surface and, by proper injection of a liquid fumigant to the required depths, it diffuses through the soil mass as a gas and is retained in the soil long enough to achieve destruction of such organisms.

We claim as our invention:

1. Apparatus for applying liquid under the soil, including a frame mounted for movement over the soil and having a tank for liquid mounted thereon, a tube mounted on said frame and extending downwardly therefrom into a position to extend below the surface of the ground and having a discharge opening in the lower end thereof, and a reinforcing member secured to said frame and to said tube and extending in advance of said tube for forming a cut in the soil into which liquid is to be discharged, means for supplying liquid from said tank to said tube, and a wire member movably arranged in the discharge end of said tube and movable by contact with the soil to keep said tube clear.

2. Apparatus for applying liquid under the soil, including a frame mounted on ground wheels and having a tank for liquid mounted thereon, a cutting member mounted on said frame and having a downwardly and rearwardly inclined blade arranged in position to have the rear end thereof project into the soil approximately to the depth to which the liquid is to be applied, a tube directly in rear of said cutting member and projecting into the portion of the soil cut by said cutting member and having a discharge opening in the lower end thereof for discharging liquid from said tank into the bottom of the cut made in the soil by said cutting member, and a wire member movably arranged in the discharge end of said tube and movable by contact with the soil to keep said tube clear.

3. Apparatus for applying liquid under the soil, including a frame mounted on ground wheels and having a tank for liquid mounted thereon, a cutting member mounted on said frame and having a downwardly and rearwardly inclined blade arranged to have the rear end thereof project into the soil approximately to the depth to which the liquid is to be applied, said cutting member also including an arm extending upwardly from said blade and secured to said frame, and a tube directly in rear of said arm and projecting into the portion of the soil cut by said cutting member and having a discharge opening in the lower end thereof, means for supplying liquid from said tank to said tube, and a wire member movably arranged in the discharge end of said tube and movable by contact with the soil to keep said tube clear.

4. Apparatus for applying liquid under the soil, including a frame mounted on ground wheels and having a tank for liquid mounted thereon, a cutting member mounted on said frame in position to project into the soil approximately to the depth to which the liquid is to be applied, and a tube directly in rear of said cutting member and projecting into the portion of the soil cut by said cutting member and having a discharge opening in the lower end thereof, means for supplying liquid from said tank to said tube, and a flexible wire in said tube and extending through said discharge opening and beyond said tube, into position to be moved by contact with the soil to keep said tube open for the discharge of liquid.

5. Apparatus for applying liquid under the soil, including a frame mounted for movement over the soil and having a tank for liquid mounted thereon, a tube mounted on said frame and extending downwardly therefrom into a position to extend below the surface of the ground and having a discharge opening in the lower end thereof, means for supplying liquid from said tank to said tube, a valve in said tube for controlling the discharge of liquid therefrom, and a flexible wire in said tube having one end thereof secured to said valve and having the other end thereof extending through the discharge opening of said tube and beyond said tube in position to be contacted and moved by the soil to keep said tube clear.

6. Apparatus for applying liquid under the soil and including a tube mounted thereon in position to extend under the soil, while the apparatus is passing over the soil, a flexible wire in said tube and having an end extending outwardly beyond the discharge end of said tube for engagement with the soil during the movement of said apparatus to keep said tube clear, and means for supplying liquid to said tube for discharge into the soil.

JACK MAYSON BICKERTON.
GEORGE PETER MALVESE.

REFERENCES CITED

The following references are of record in the file of this patent:

UNITED STATES PATENTS

| Number | Name | Date |
|---|---|---|
| Re. 10,982 | Smith | Jan. 29, 1889 |
| 23,183 | Markham et al. | Mar. 8, 1859 |
| 537,739 | Witters | Apr. 16, 1895 |
| 556,588 | Risley | Mar. 17, 1896 |
| 582,610 | Allen | May 18, 1897 |
| 726,395 | Bedworth | Apr. 28, 1903 |
| 1,207,274 | Carter | Dec. 5, 1916 |
| 1,779,849 | Lusk | Oct. 28, 1930 |

FOREIGN PATENTS

| Number | Country | Date |
|---|---|---|
| 144,505 | France | Aug. 12, 1881 |
| 161,192 | France | Mar. 26, 1884 |
| 576,220 | Germany | May 8, 1933 |
| 843,895 | France | Apr. 3, 1939 |